(12) United States Patent
Song et al.

(10) Patent No.: US 9,243,736 B2
(45) Date of Patent: Jan. 26, 2016

(54) STRUCTURE OF VACUUM INSULATOR WITH ASSEMBLY RECIPROCATING SUPPORT

(71) Applicant: Korea Advanced Institute of Science and Technology, Daejeon (KR)

(72) Inventors: Tae-Ho Song, Daejeon (KR); Seong Wook Cho, Seoul (KR); Hae-yong Jung, Daejeon (KR); Jongmin Kim, Daejeon (KR); In-Seok Yeo, Daejeon (KR); Bongsu Choi, Daejeon (KR); Jae Hyug Lee, Daejeon (KR); SeungWook Kim, Seoul (KR); Wookjin Lee, Seoul (KR); Shin-Woo Jang, Seoul (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 14/261,101

(22) Filed: Apr. 24, 2014

(65) Prior Publication Data

US 2014/0322481 A1 Oct. 30, 2014

(30) Foreign Application Priority Data

Apr. 24, 2013 (KR) .......................... 10-2013-0045369

(51) Int. Cl.
*F16L 59/065* (2006.01)

(52) U.S. Cl.
CPC ........ *F16L 59/065* (2013.01); *Y10T 428/24025* (2015.01)

(58) Field of Classification Search
CPC ..... Y10T 428/231; E04B 1/803; Y02B 80/12; F16L 59/065
USPC ........................................................... 428/69
See application file for complete search history.

(56) References Cited

U.S. PATENT DOCUMENTS 4,618,517 A * 10/1986 Simko, Jr. .................... 428/34.4
4,837,388 A * 6/1989 Kugelmann ................... 428/69

FOREIGN PATENT DOCUMENTS

KR 1020100109563 10/2010

* cited by examiner

*Primary Examiner* — Alexander Thomas
(74) *Attorney, Agent, or Firm* — Blank Rome LLP

(57) ABSTRACT

Provided is an inner structure of a vacuum insulator with an assembly reciprocating support to increase an insulation performance, the structure of the vacuum insulator including a top board, a bottom board, and an assembly reciprocating support installed perpendicularly between the top board and the bottom board, the assembly reciprocating support including a solid shaft, a hollow shaft, and a connection part.

5 Claims, 3 Drawing Sheets

STRUCTURE OF VACUUM INSULATOR WITH ASSEMBLY RECIPROCATING SUPPORT

CROSS-REFERENCE TO RELATED APPLICATION

This application claims the benefit of Korean Patent Application No. 10-2013-0045369, filed on Apr. 24, 2013, in the Korean Intellectual Property Office, the disclosure of which is incorporated herein by reference.

BACKGROUND

1. Field of the Invention

The present invention relates to a structure of a vacuum insulator with an assembly reciprocating support that may increase a thermal insulation performance.

2. Description of the Related Art

It is estimated that about one half of global energy consumption is attributed to residential and commercial buildings, and a large portion of such energy is used for heating and cooling the buildings. Recently, an innovative method, a vacuum insulator, is emerging as a method of reducing an amount of energy necessary for heating and cooling.

The vacuum insulator is highly evacuated to get rid of the heat transfer through a gas. Therefore, the vacuum insulator has an insulation performance at least 10 times higher than conventional insulators, for example, polyurethane foam, and glass wool. Due to high insulation performance of the vacuum insulator, energy loss may be effectively reduced. Since the vacuum insulator may occupy a relatively small space, utilization of spaces in a building may be improved. Due to such advantages, research on the vacuum insulator is being conducted widely with respect to a building, a refrigerator, and a liquefied natural gas (LNG) carrier.

Korean patent application publication No. 2011-0049363 is directed to a vacuum insulator. The vacuum insulator includes only a core material and an envelope. Since an external atmospheric pressure may be applied directly to the core material, the core material may need to act as an assembly reciprocating support configured to endure the atmospheric pressure. Thus, a material of the core material may be limited to a material that may endure compression. In addition, a density of the core material may be changed by the compression, and such a change may cause a decrease in an insulation performance.

SUMMARY

An aspect of the present invention provides a structure of a vacuum insulator including an assembly reciprocating support having a relatively long heat transfer path instead of simple cylindrical shape.

Another aspect of the present invention also provides a structure of a vacuum insulator that may restrain a decrease in an insulation performance or damage to a core material by means of an assembly reciprocating support configured to endure an atmospheric pressure applied to a top and a bottom of the vacuum insulator, and increase the insulation performance through a long heat transfer path.

According to an aspect of the present invention, there is provided a structure of a vacuum insulator configured to increase a thermal insulation performance of the vacuum insulator, the structure including a top board, a bottom board, and an assembly reciprocating support including a solid shaft, a hollow shaft, and a connection part between the top board and the bottom board.

The top board and the bottom board respectively configured using a flat surface board may be disposed parallel to each other with a space corresponding to a size of the assembly reciprocating support, and the assembly reciprocating support may be installed perpendicularly between the top board and the bottom board.

The solid shaft may be disposed in a concave portion at a center of the connection part and the connection part may be disposed on the hollow shaft to endure an atmospheric pressure.

A material of the vacuum insulator may be determined based on a figure of merit, and the figure of merit may be proportional to a yield strength and inversely proportional to a thermal conductivity coefficient.

Respective materials of the top board, the bottom board, the solid shaft, the hollow shaft, and the connection part may be determined based on yield strengths and thermal conductivity coefficients.

The material of the vacuum insulator may include polycarbonate used for the top board, the bottom board, the solid shaft, and the hollow shaft, and stainless steel used for the connection part.

The top board, the bottom board, and the assembly reciprocating support may be coated with a metal in view of a reflectivity and an emissivity to minimize radiative heat transfer.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
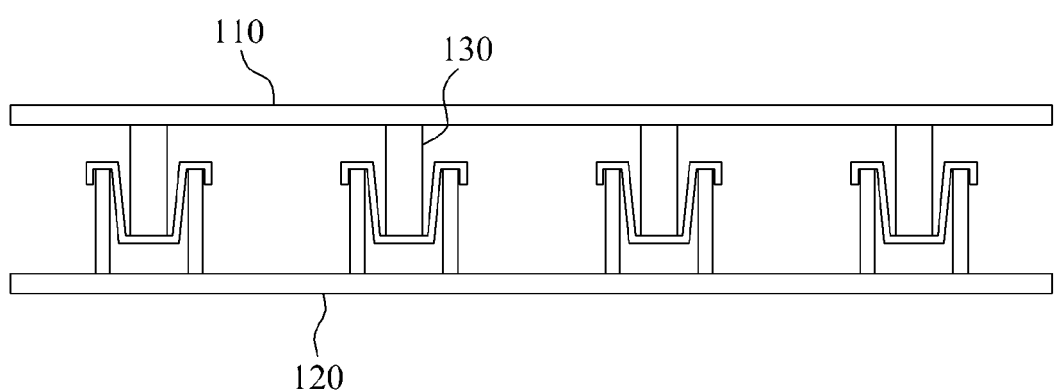
FIG. 1 is a cross-sectional view illustrating a structure of a vacuum insulator according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a structure of a vacuum insulator according to exemplary embodiments of the present invention will be described in detail with reference to the accompanying drawings. However, it can be easily understood by those skilled in the art that the drawings are only illustrative to easily describe the contents of the present invention and are not intended to limit the scope of the present invention.

FIG. 1 is a cross-sectional view illustrating a structure of a vacuum insulator according to an embodiment of the present invention.

Referring to FIG. 1, the vacuum insulator may include a top board 110, a bottom board 120, and an assembly reciprocating support 130. The top board 110 and the bottom board 120 may be respectively configured using a flat surface board, and be disposed parallel to each other with a predetermined space. The assembly reciprocating support 130 may be installed perpendicularly between the top board 110 and the bottom board 120.

The vacuum insulator may operate based on a principle that an atmospheric pressure is applied to the top board 110 and the bottom board 120 and the assembly reciprocating support 130 endures the applied pressure. Since the atmospheric pressure may not be applied to a core material used in the vacuum insulator, the core material may not be damaged. Thus, there is a wide range of materials that may be used for the core material. In addition, a density and a thermal conductivity coefficient may not increase. Thus, a more excellent insulation performance may be achieved, in comparison to a conventional vacuum insulator.

A material of the vacuum insulator may be determined by calculating a figure of merit. The figure of merit may be expressed by Equation 1.

$$Z = \frac{\sigma_{YS}}{k} \quad \text{[Equation 1]}$$

Figure 2A:
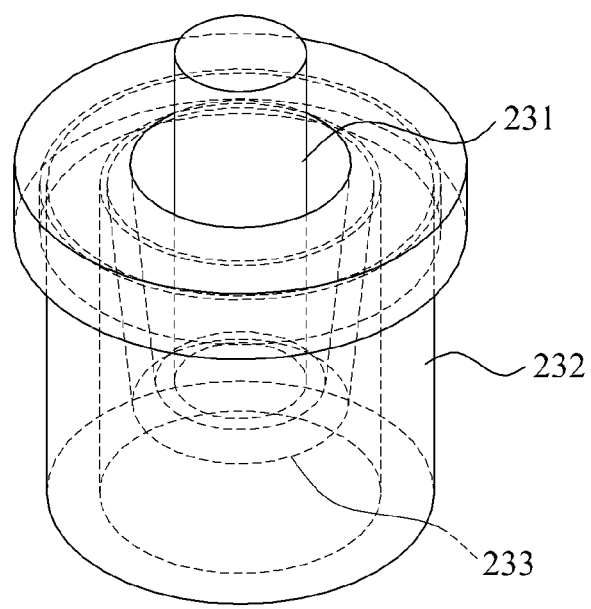
FIG. 2A is a perspective view illustrating an assembly reciprocating support according to an embodiment of the present invention.
Figure 2B:
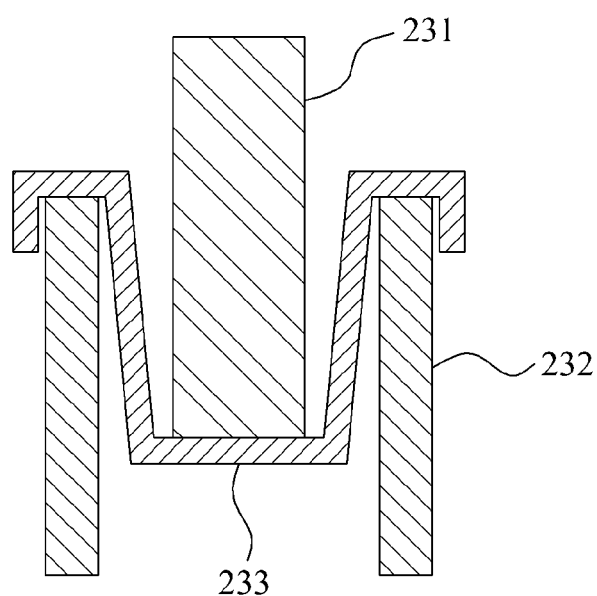
FIG. 2B is a cross-sectional view illustrating an assembly reciprocating support according to an embodiment of the present invention.

In Equation 1, Z denotes a figure of merit, $\sigma_{YS}$ denotes a yield strength, and k denotes a thermal conductivity coefficient. As a value of the figure of merit increases, the insulation performance may increase. Accordingly, polycarbonate having a relatively high figure of merit may be used for the top board 110, the bottom board 120, and a solid shaft 231, and a hollow shaft 232, and stainless steel may be used for a connection part 233. The solid shaft 231, the hollow shaft 232, and the connection part 233 are illustrated in FIGS. 2A and 2B. Polycarbonate has a more excellent figure of merit than stainless steel. However, the high stress is concentrated at connection part 233, stainless steel having a relatively high yield stress may be suitable for the connection part 233.

Reducing radiative heat transfer, in addition to conductive heat transfer, may be significant. The radiative heat transfer may be effectively reduced by coating the top board 110, the bottom board 120, and the assembly reciprocating support 130 with a metal with a high reflectivity and a low emissivity.

FIG. 2A is a perspective view illustrating an assembly reciprocating support according to an embodiment of the present invention.

Referring to FIG. 2A, the assembly reciprocating support may include the solid shaft 231, the hollow shaft 232, and the connection part 233. The assembly reciprocating support may be installed perpendicularly between a top board and a bottom board. The assembly reciprocating support may be completed by disposing the solid shaft 231 in a concave portion at a center of the connection part 233 and disposing the connection part 233 on the hollow shaft 232. The reciprocating support is an assembly type, rather than an integrated type. Thus, the reciprocating support may be manufactured in a small size, with relative ease. Sizes of the solid shaft 231, the hollow shaft 232, and the connection part 233 may be designed in view of a stress applied to the assembly reciprocating support by an atmospheric pressure and yield strengths of materials.

FIG. 2B is a cross-sectional view illustrating an assembly reciprocating support according to an embodiment of the present invention.

Referring to FIG. 2B, the assembly reciprocating support may include the solid shaft 231, the hollow shaft 232, and the connection part 233. The assembly reciprocating support may be installed perpendicularly between a top board and a bottom board. The assembly reciprocating support may be completed by disposing the solid shaft 231 in a concave portion at a center of the connection part 233 and disposing the connection part 233 on the hollow shaft 232.

The assembly reciprocating support may have a reciprocating shape from the solid shaft 231 through the hollow shaft 232 to the connection part 233. Thus, a heat transfer path may be relatively long, in comparison to a simple cylindrical shape. In addition, conductive heat transfer may be reduced due to a contact resistance occurring on a contact surface and thus, the insulation performance may increase.

According to embodiments of the present invention, a support inserted in a vacuum insulator may be provided in a reciprocating shape having a relatively long heat transfer path to endure an external atmospheric pressure. Thus, heat transfer may be reduced in comparison to a vacuum insulation provided in a simple cylindrical shape, and an insulator with a more excellent performance than a conventional vacuum insulator may be manufactured.

According to embodiments of the present invention, an external atmospheric pressure to be applied to a core material of a vacuum insulator may be blocked. Thus, various materials may be used for the core material, irrespective of deformation, and an increase in a thermal conductivity coefficient of the inner core caused by compression may be restrained.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A structure of a vacuum insulator configured to increase a thermal insulation performance of the vacuum insulator, the structure comprising:
   a top board;
   a bottom board; and
   an assembly reciprocating support comprising a solid shaft, a hollow shaft, and a connection part between the top board and the bottom board;
   wherein in the structure of the vacuum insulator, a material of the vacuum insulator is determined based on a figure of merit, and the figure of merit is proportional to a yield strength of the material and inversely proportional to a thermal conductivity coefficient; and
   wherein the material of the vacuum insulator comprises polycarbonate used for the top board, the bottom board, the solid shaft, and the hollow shaft, and stainless steel used for the connection part.

2. The structure of claim 1, wherein the top board and the bottom board respectively configured using a flat surface board are disposed parallel to each other with a space corresponding to a size of the assembly reciprocating support, and the assembly reciprocating support is installed perpendicularly between the top board and the bottom board.

3. The structure of claim 1, wherein in the assembly reciprocating support, the solid shaft is disposed in a concave portion at a center of the connection part and the connection part is disposed on the hollow shaft to endure an atmospheric pressure.

4. The structure of claim 1, wherein respective materials of the top board, the bottom board, the solid shaft, the hollow shaft, and the connection part are determined based on yield strengths and thermal conductivity coefficients.

5. The structure of claim 1, wherein the top board, the bottom board, and the assembly reciprocating support are coated with a metal in view of a reflectivity and an emissivity to minimize radiant heat transfer.

* * * * *